Nov. 25, 1952         W. R. BOARIO ET AL         2,619,633
       MEANS FOR PRODUCING MULTIPLE TONE EFFECT
           IN CATHODE-RAY TUBE INDICATIONS
                  Filed Feb. 12, 1948

INVENTORS.
WILLIAM R. BOARIO
DALE E. OYSTER
BY Wade Koontz AND
ATTORNEY
James P. Shannon
AGENT Patented Nov. 25, 1952

2,619,633

UNITED STATES PATENT OFFICE 2,619,633

MEANS FOR PRODUCING MULTIPLE TONE EFFECT IN CATHODE-RAY TUBE INDICATIONS

William R. Boario and Dale E. Oyster, Dayton, Ohio

Application February 12, 1948, Serial No. 7,904

3 Claims. (Cl. 343—11)

(Granted under the act of March 3, 1883, as amended April 30, 1928; 370 O. G. 757)

The invention described herein may be manufactured and used by or for the Government for governmental purposes without payment to us of any royalty thereon.

This invention relates to a method and means for producing a multiple tone effect on the screen of a cathode-ray tube, particularly a cathode-ray tube used as an indicator in radio direction and range determining systems commonly known as radar systems.

In radar systems employing what is known as the PPI type of scan the antenna which radiates pulses of energy and receives reflected pulses of energy is designed to be highly directional in the horizontal plane and to rotate through an angle of 360° so as to scan an area centered on the antenna. In the cathode-ray tube indicator used in this system it is arranged that the beam scan radially outward from the center once for each transmitted pulse of energy while being rotated in step with the antenna through 360°. The cathode-ray tube is usually so biased that the spot produced by the beam on the fluorescent screen is just at the threshold of visibility so that any increases in potential of the beam intensity control electrode due to the reception of reflected energy will cause a spot to appear on the screen in the same relative position to the center of the screen that the object causing the reflection bears to the antenna. Since a large number of pulses are transmitted per degree rotation of the antenna a thorough exploration of the scanned area is obtained and the resulting image on the screen of the cathode-ray tube is in the form of a map of the area.

In a system of the above type the received signal is composed of reflections of the radiated energy and also random disturbances which may be referred to as noise. Of the reflections a large proportion may be of small amplitude from minor objects and irregularities in the scanned area. The smaller reflections and noise together produce a large number of images or spots on the screen which may operate to obscure the images of important objects in the scanned area from which strong reflections are obtained. It is the object of this invention to increase the contrast between the images of important objects which produce strong reflections and the images resulting from the weaker reflections from small objects and irregularities in the area and from noise. This is accomplished in accordance with the invention by maintaining the gain of the receiver for the greater part of the time below the value required for the weaker reflections and noise to be able to produce indications on the cathode-ray tube screen and periodically raising the gain of the receiver for short intervals during which all reflections are able to produce indications on the screen. By thus reducing the time during which images from weaker reflections appear on the screen the overall brightness of these images is reduced and as a result the images from objects producing strong reflections are made to stand out by contrast. For example, in the map of an island as produced by a system employing the invention the outline of the island and relatively uniform areas thereon would appear as a dim background against which the images of large objects such as mountains would be bright and sharply defined.

An embodiment of the invention is shown in the accompanying drawing in which

Figure 1:
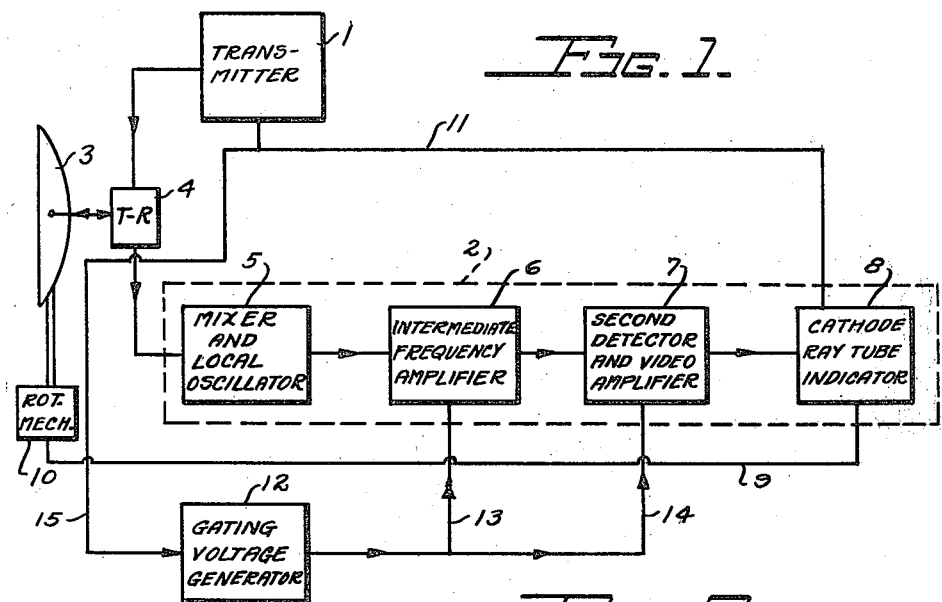
Fig. 1 is a block diagram of a radar system employing the invention.

Referring to Fig. 1, numerals 1, 2 and 3 represent respectively the transmitter, receiver and antenna of a radar system. The block 4 represents a transmit-receive network which serves to couple the transmitter and receiver to the common antenna and to prevent the application of transmitted pulses to the receiver. The receiver 2 comprises a mixer and local oscillator 5, an intermediate frequency amplifier 6, a second detector and video amplifier 7 and a cathode-ray tube indicator 8. The cathode-ray tube indicator is of the type having a PPI scan as described above. A connection 9 between the indicator 8 and the antenna revolving mechanism 10 serves to rotate the beam of the cathode-ray tube at the same rate as the antenna. Synchronizing pulses for initiating the outward sweep of the beam of the cathode-ray tube in indicator 8 are applied thereto from the transmitter by means of connection 11. Radar systems of this type are conventional and it is therefore not necessary to explain the specific details of the various components in this application.

In a system of the above described type the antenna 3 rotates at a constant speed and equally spaced pulses of energy are applied thereto by transmitter 1. These pulses are radiated by the antenna in a narrow beam and upon striking an object in the path of the beam are reflected and received by the same antenna 3 and are then applied through the T-R network 4 to the receiver 2. This is a conventional superheterodyne receiver that selects, amplifies and detects the received pulses of energy to produce corresponding pulses of direct voltage which are applied to the beam intensity control electrode of the cathode-ray tube in indicator 8. This electrode is biased just to the cut-off point so that the application of a positive pulse thereto serves to turn on the beam and to cause a spot to appear on the fluorescent screen of the tube. Each time a pulse is transmitted a coincident trigger pulse is applied to the cathode-ray tube indicator 8 through connection 11 and serves to start the beam of the tube on its outward radial sweep from the center. Since the distance of the above mentioned spot from the center of the screen is determined by the time required for a pulse of energy to travel to the obstruction and be reflected back to the antenna, this distance is proportional to the distance of the obstruction from the antenna. Also, since the electron beam of the indicator tube rotates with the antenna, the spot on the screen has the same azimuth as the corresponding obstruction in the scanned field.

The above described conventional radar system is modified in accordance with the invention by the addition of the gating voltage generator 12. This element may be any circuit capable of operating in synchronism with the transmitted pulses to generate a voltage wave of the form shown in Fig. 3 (c). This voltage is applied to the intermediate frequency amplifier and the video amplifier of receiver 2 over connections 13 and 14 and serves to control the gain of these amplifiers. Synchronization is produced by a series of trigger pulses as in Fig. 3 (a), which are obtained from the transmitter and which are coincident with the transmitted pulses. These trigger pulses are applied to generator 12 over connection 15. The amplitude of the voltage shown in Fig. 3 (c) is adjusted so that during the interval $t_1$ the receiver gain is such that only received pulses having amplitudes above a predetermined level are applied to the indicator tube whereas during the interval $t_2$ all received pulses are applied to the tube. In this way the brightness of indications on the cathode-ray tube screen representing objects producing relatively weaker reflections is reduced causing the indications of objects producing relatively stronger reflections, which are applied to the indicator tube during both intervals $t_1$ and $t_2$, to stand out by contrast. In order to produce the proper contrast between important and unimportant objects in the scanned area it has been found that the ratio of $t_1$ to $t_2$ should be about 3 to 1.

Figure 2:
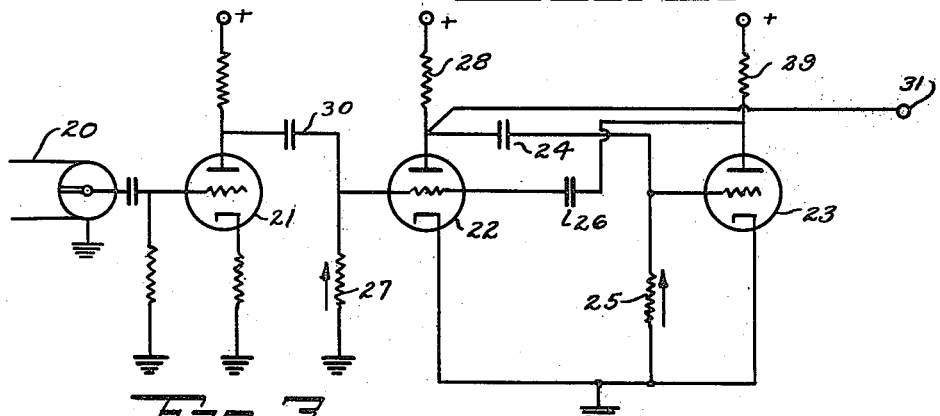
Fig. 2 shows a possible circuit for generating the gating voltages used in Fig. 1.
Figure 3:
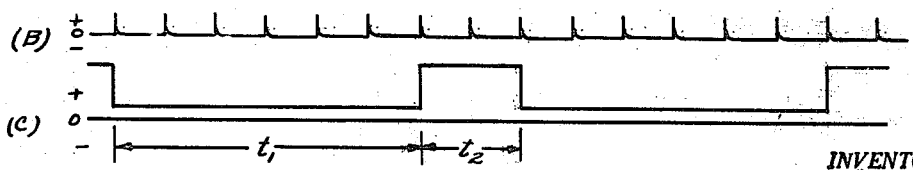
Fig. 3 shows various wave forms occurring in the system.

As stated any circuit may be used for the gating voltage generator 7 which is capable of being synchronized with the radar transmitter and of producing a gating voltage of the form shown in Fig. 3 (c). One circuit capable of performing this function is shown in Fig. 2. Referring to this figure, the negative synchronizing pulses shown in Fig. 3 (a) are obtained from the transmitter and applied by transmission line 20 to the grid of tube 21. This tube is employed in a conventional resistance coupled stage and serves the function of isolating the subsequent parts of the generator circuit from the transmission line 20 and also serves to invert the synchronizing or trigger pulses so as to produce a series of positive pulses as shown in Fig. 3 (b). The tubes 22 and 23 form part of an unbalanced multivibrator. The anode of tube 22 is coupled to the grid of tube 23 by means of condenser 24 and resistor 25. Likewise, the grid of tube is coupled to the grid of tube 22 by means of condenser 26 and resistor 27. Resistors 28 and 29 serve as load resistors for tubes 22 and 23 respectively and connect the anode of these tubes to a source of positive potential. The cathodes of tubes 22 and 23 are connected together and to ground. The output of the inverter stage comprising tube 21 is coupled to the grid of tube 22 through condenser 30 which serves to apply the positive series of sharp pulses shown in Fig. 3 (b) to the grid of tube 22. The construction and operation of synchronized multivibrator circuits of the above described type are well known. Briefly, the operation is as follows:

Assuming that at the time of occurrence of the first positive pulse in the series of Fig. 3 (b) that the tube 22 is in a nonconductive state. The application of this positive pulse to the grid of this tube will render the tube conductive and cause the anode potential to fall as shown in Fig. 3 (c), which is the wave form of the voltage on the anode of this tube. The lowering of the anode potential of the tube 22 allows the condenser 24 to discharge producing the upward flow of current in resistor 25, as shown by the arrow in Fig. 2, and this produces a high negative bias of the grid of the tube 23 which drives the grid beyond cut-off and renders the tube nonconductive. This discharge current is maximum at the beginning of the discharge and gradually decreases depending upon the time constant of the circuit comprising condenser 24 and resistors 25 and 28. After a period of time indicated as $t_1$ in Fig. 3 (c) the discharge current through resistor 25 has reduced sufficiently to allow the grid potential of tube 23 to rise to the cut-off value at which time tube 23 begins to conduct. This causes an immediate shift in the condition of the circuit to one in which the tube 23 is fully conducting and the tube 22 is cut off.

The cutting off of the tube 22 is produced by the dicharging of condenser 26 through resistor 27 which drives the potential of the grid of this tube beyond the cut-off point. Any of the positive pulses applied to the grid of tube 22 during the interval of $t_1$ have no effect on the multivibrator since the tube is already conducting during this period. Also positive pulses applied to the grid of tube 22 at, or shortly after, the end of period $t_1$ have no effect on the multivibrator since the high negative potential on the grid of the tube 22 due to the discharging of the condenser 26 is sufficient to prevent the positive pulse from rendering the tube conductive. However, after a period of time the discharge current through the resistor 27 will have fallen sufficiently to allow the voltage of the grid of tube 22 to rise to such a level that a positive trigger pulse applied thereto will cause the tube to conduct.

At the occurrence of this pulse the tube 22 is again rendered conductive ending one cycle of operation of the multivibrator and beginning the next. This is shown in Fig. 3 as occurring at the ninth positive pulse. It is therefore seen that the period $t_1$ during which the gating voltage has its lower value is determined by the time constant of the circuit comprising the condenser 24 and resistors 25 and 28 and that the period $t_2$ is determined by the time constant of the circuit comprising condenser 26 and resistors 27 and 29 since the rate at which this condenser discharges determines the length of time required for the potential of grid of tube 22 to rise to such value that one of the positive pulses can trigger the tube 22. However, the exact termination of the period $t_2$ is determined by the occurrence of the positive trigger pulses which at this time initiates the beginning of the period $t_1$. The time constants of the circuits in the multivibrator should be so adjusted that the end of period $t_1$ and the beginning of the period $t_2$ occur as close as possible to one of the synchronizing pulses, however the synchronizing pulses assert no control at this point. The voltage for controlling the gain of the intermediate frequency and video amplifiers in the receiver may be taken from between terminal 31, which is connected to the anode of tube 22, and ground.

What we claim is:

1. In a radio direction and range determining system of the type having a transmitter capable of transmitting a directional beam of rapidly repeated pulses of radiant energy, a receiver for receiving reflections of said energy from objects in the path of said beam, and a cathode-ray tube indicator connected to the output of said receiver and capable of producing a representation on its screen of reflected pulses from each of said objects, means for increasing the contrast between the representations of objects producing strong reflections and objects producing weaker reflections of energy, said means comprising means for alternately switching the gain of said receiver between a fixed upper value for which all reflections are able to operate said cathode-ray tube indicator and a fixed lower value for which only the stronger reflections are able to operate said cathode-ray tube indicator, the gain being held at each value for periods not less than the time interval between said repeated pulses.

2. In a radio direction and range determining system of the type having a transmitter capable of scanning a given area with a directional beam of rapidly repeated pulses of radiant energy, a directional receiver having intermediate frequency and video frequency amplifiers for receiving reflections of said energy from objects in said area and a cathode ray tube indicator associated with said receiver capable of producing a plan representation of said scanned area, means for increasing the contrast between various objects represented in said plan representation, said means comprising means for alternately switching the gain of said receiver between a fixed upper value for which all reflections are indicated on said cathode ray tube indicator and a fixed lower value for which only the stronger reflections are so indicated, said values being maintained for periods exceeding the time interval between said repeated pulses, said means for alternately switching the gain of said receiver between fixed upper and lower values comprising means for generating a substantially square wave of voltage, means for applying said square wave of voltage to the intermediate frequency and video frequency amplifiers of said receiver for controlling the gains thereof, and means for synchronizing the square wave generator with the pulses radiated by said transmitter at a submultiple of the repetition frequency of said pulses.

3. In a radio direction and range determining system of the type having a transmitter capable of scanning a given area with a directional beam of rapidly repeated pulses of radiant energy, a directional receiver for receiving reflections of said energy from objects in said area and a cathode-ray tube indicator associated with said receiver capable of producing a plan representation of said scanned area, means for increasing the contrast in said plan representation between objects in said scanned area that produce relatively strong reflections and objects that produce relatively weak reflections, said means comprising means for periodically lowering the gain of said receiver for an interval of time exceeding the time interval between said repeated pulses and sufficiently to prevent the relatively weak reflections but not the relatively strong reflections from being represented on said cathode-ray tube indicator during the period of lowered gain, said last named means comprising a substantially square voltage wave generating multivibrator having a natural frequency that is equal or near to a submultiple of the pulse repetition frequency of said transmitter, means for applying triggering pulses coincident with said transmitted pulses from said transmitter to said multivibrator for synchronizing the operation thereof with the transmitted pulses, and means for applying said square wave to said receiver to control the gain thereof.

WILLIAM R. BOARIO.
DALE E. OYSTER.

REFERENCES CITED

The following references are of record in the file of this patent:

UNITED STATES PATENTS

| Number | Name | Date |
|---|---|---|
| 2,401,432 | Luck | June 4, 1946 |
| 2,403,527 | Hershberger | July 9, 1946 |
| 2,419,620 | Young | Apr. 29, 1947 |
| 2,435,960 | Fyler | Feb. 17, 1948 |
| 2,446,244 | Richmond | Aug. 3, 1948 |
| 2,449,985 | Gloess | Sept. 28, 1948 |
| 2,453,711 | Isbister et al. | Nov. 16, 1948 |
| 2,483,187 | Dolberg | Sept. 27, 1949 |
| 2,502,454 | Greig | Apr. 4, 1950 |